(12) United States Patent
Baden

(10) Patent No.: US 8,616,344 B2
(45) Date of Patent: Dec. 31, 2013

(54) ASYMMETRICAL BRAKE TORQUE PLATE BACK LEG

(75) Inventor: Bradley J. Baden, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 562 days.

(21) Appl. No.: 12/595,673

(22) PCT Filed: May 21, 2008

(86) PCT No.: PCT/US2008/064313
§ 371 (c)(1),
(2), (4) Date: Oct. 13, 2009

(87) PCT Pub. No.: WO2009/029309
PCT Pub. Date: Mar. 5, 2009

(65) Prior Publication Data
US 2010/0140027 A1    Jun. 10, 2010

Related U.S. Application Data

(60) Provisional application No. 60/939,192, filed on May 21, 2007.

(51) Int. Cl.
*F16D 55/36* (2006.01)

(52) U.S. Cl.
USPC ........................................................ 188/71.5

(58) Field of Classification Search
USPC ........... 192/70.16, 70.2; 188/218, 18 A, 71.5, 188/73.1, 73.31, 73.39, 218 XL
See application file for complete search history.

(56) References Cited

U.S. PATENT DOCUMENTS

| 4,878,563 A * | 11/1989 | Baden et al. ................. 188/71.5 |
| 5,255,761 A | 10/1993 | Zaremsky |
| 6,131,707 A | 10/2000 | Buechel et al. |
| 6,752,248 B2 * | 6/2004 | Berwanger ................. 188/73.39 |
| 7,124,860 B2 * | 10/2006 | Souetre et al. ............... 188/71.5 |
| 2003/0111304 A1 * | 6/2003 | Evrard .......................... 188/71.1 |
| 2006/0201754 A1 * | 9/2006 | Dyko et al. .................. 188/71.5 |

FOREIGN PATENT DOCUMENTS

| DE | 1168270 | 4/1964 |
| EP | 1004787 | 5/2000 |
| WO | 03/021126 | 3/2003 |

OTHER PUBLICATIONS

EPO Examination Report dated Jun. 21, 2010.
EPO Examination Report for EP Application No. 08828658.8 dated Nov. 22, 2010.
International Preliminary Report on Patentability for PCT/US2008/064313, dated Nov. 21, 2009.
Written Opinion for PCT/US2008/064313, dated Nov. 21, 2009.
Publication with International Search report for PCT/US2008/064313, dated Mar. 5, 2009.

* cited by examiner

*Primary Examiner* — Bradley King
*Assistant Examiner* — Vishal Sahni
(74) *Attorney, Agent, or Firm* — Snell & Wilmer, L.L.P.

(57) ABSTRACT

A brake comprising a brake disk stack including stators alternating with rotors that are rotatable relative to the stators about an axis of the disk stack, an annular torque plate at one axial end of the brake disk stack, and a circumferential arrangement of actuators at the other axial end of the brake disk stack for urging the brake disk stack against the torque plate thereby to effect a braking force on the rotors. A back leg (33) of the annular torque plate includes a plurality of apertures (110a-110f) arranged asymmetrically around the axis of the brake disk stack.

8 Claims, 10 Drawing Sheets

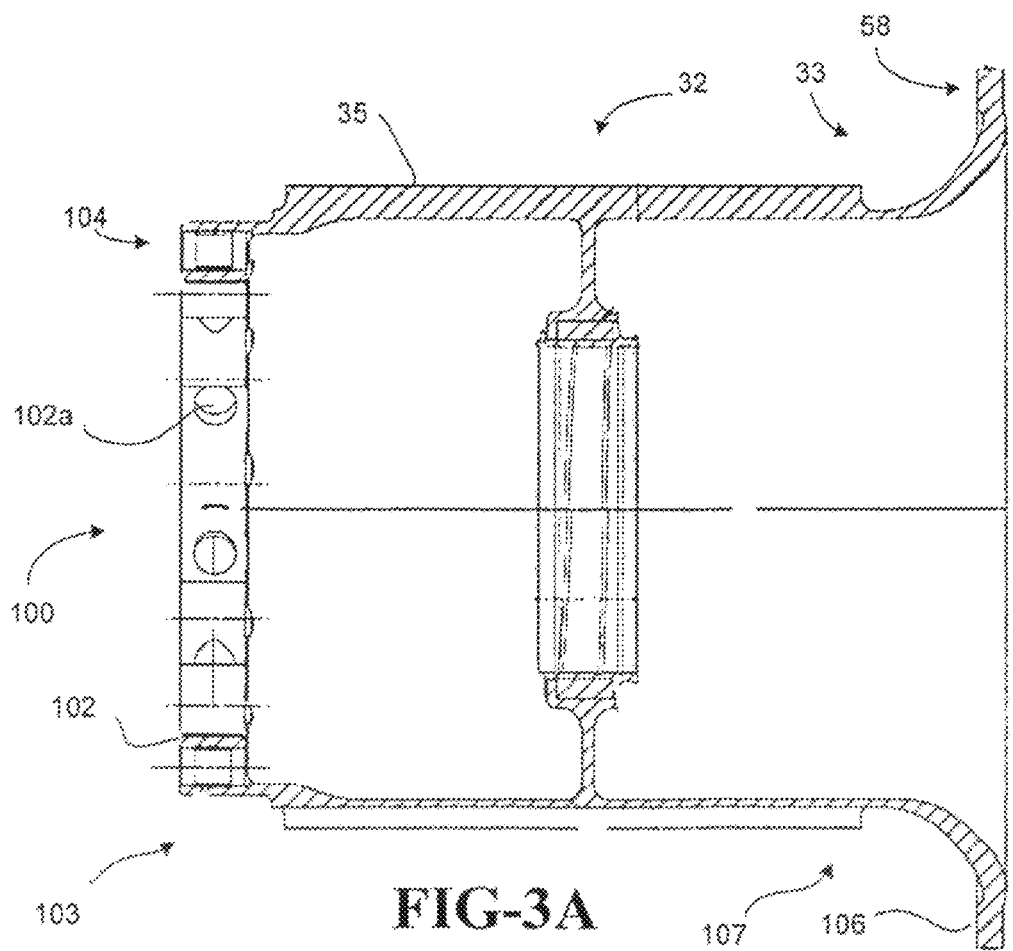

Test 24540, Stop 268 landing snub

Test 24423, Stop 284 landing snub

Test 24540, Stop 414 landing snub

Test 24423, Stop 416 landing snub

Typical landing stop transient vibration showing reduced levels with the slotted torque plate back leg (Test No. 24540)

Test 24540, Stop 128 hot taxi

Test 24423, Stop 128 hot taxi

Test 24540, Stop 487 hot taxi

Test 24423, Stop 489 hot taxi

Typical hot taxi stop transient vibration showing reduced levels and sustaining time with the slotted torque plate back leg (Test No. 24540)

ASYMMETRICAL BRAKE TORQUE PLATE BACK LEG

CROSS-REFERENCE TO RELATED APPLICATIONS

This application is a U.S. National Phase filing under 35 U.S.C. 371 and claims priority to PCT Application No. PCT/US08/64313, filed on May 21, 2008, and entitled "ASYMMETRICAL BRAKE TORQUE PLATE BACK LEG," which claims priority to U.S. Provisional Patent Application Ser. No. 60/939,192, filed May 21, 2007, both of which are incorporated herein by reference in their entirety.

FIELD OF THE INVENTION

The present invention relates generally to brakes and, more particularly, to an aircraft brake that includes an asymmetrical brake torque plate.

BACKGROUND OF THE INVENTION

Aircraft wheel and brakes heretofore have included a non-rotatable wheel support, a wheel rotatably mounted to the wheel support, and a brake disk stack having alternating rotor and stator disks mounted with respect to the wheel support and wheel for relative axial movement. Each rotor disk is coupled to the wheel for rotation therewith and each stator disk is coupled to the wheel support against rotation. A brake torque plate is located at the rear end of the disk pack and is comprises a torque tube and a back leg, while a brake head is located at the front end.

The brake head may house a plurality of actuator rams that extend to compress the brake disk stack against the brake torque plate. The brake torque plate provides the structure onto which the stator disks are splined for torque reaction, provides the reacting surface (back leg) for disk stack actuation loads, and provides the transfer of torque into adjoining structures, such as the brake piston housing or aircraft axle (e.g., via a torque tube). The back leg design of the brake torque plate can be varied to provide proper stiffness and minimum weight.

A function of aircraft brakes is to provide a stopping force or torque so as to quickly and efficiently convert kinetic energy into heat energy. In providing the stopping force, brakes may subject the aircraft (or parts thereof) to vibration. Such vibration is undesirable, as it can cause fatigue, cracking and/or failure of the aircraft's components, particularly in the area of the brakes and wheels.

SUMMARY OF THE INVENTION

Conical shape brake torque plate back legs are desirable in aircraft braking systems for a number of reasons. For example, conical shape brake torque plate back legs can be formed to have minimal weight, and yet still be capable of providing the proper stiffness for the braking system. However, it has been discovered that conical shape brake torque plate back legs can contribute to or amplify vibration created by or introduced to the braking system. These vibrations, as noted above, are undesirable.

An apparatus in accordance with the present invention reduces vibration in brakes, such as aircraft brakes, that utilize conical brake torque plates. As used herein, a brake torque plate refers to the combination of a torque tube and a back leg. A brake torque plate in accordance with the invention is formed so as to reduce symmetry of the brake torque plate (e.g., by including apertures placed asymmetrically around a circumference of the brake torque plate back leg). The brake torque plate with asymmetrically placed apertures significantly reduces vibration in the braking system.

Moreover, the reduced vibration can provide more consistent brake friction from cycle to cycle for each braking condition (e.g., landing, taxi stop). Brakes equipped with reduced symmetry brake torque plates in accordance with the invention also have been found to provide less variation between hot and cold taxi friction, which provides a more consistent pedal feel for the pilot and may promote improved wear rates.

According to one aspect of the invention, there is provided a brake system comprising a brake disk stack including stators alternating with rotors that are rotatable relative to the stators about an axis of the disk stack, an annular torque plate including a back leg at one axial end of the brake disk stack, and a circumferential arrangement of actuators at the other axial end of the brake disk stack. The actuators are operative to urge the brake disk stack against the torque plate, thereby effecting a braking force on the rotors. Further, the back leg of the annular torque plate includes a plurality of apertures arranged asymmetrically around the axis of the brake disk stack.

According to another aspect of the invention, a brake comprising a brake disk stack including stators alternating with rotors that are rotatable relative to the stators about an axis of the disk stack, an annular torque plate including a back leg at one axial end of the brake disk stack, and a circumferential arrangement of actuators at the other axial end of the brake disk stack for urging the brake disk stack against the torque plate thereby to effect a braking force on the rotors. Further, the back leg includes a plurality of circumferentially arranged segments of varying torsional and axial strength.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

The forgoing and other embodiments of the invention are hereinafter discussed with reference to the drawings.

FIGS. 3A and 3B are a cross sectional view and an end view of the torque plate of FIG. 2.

DETAILED DESCRIPTION

Figure 1:
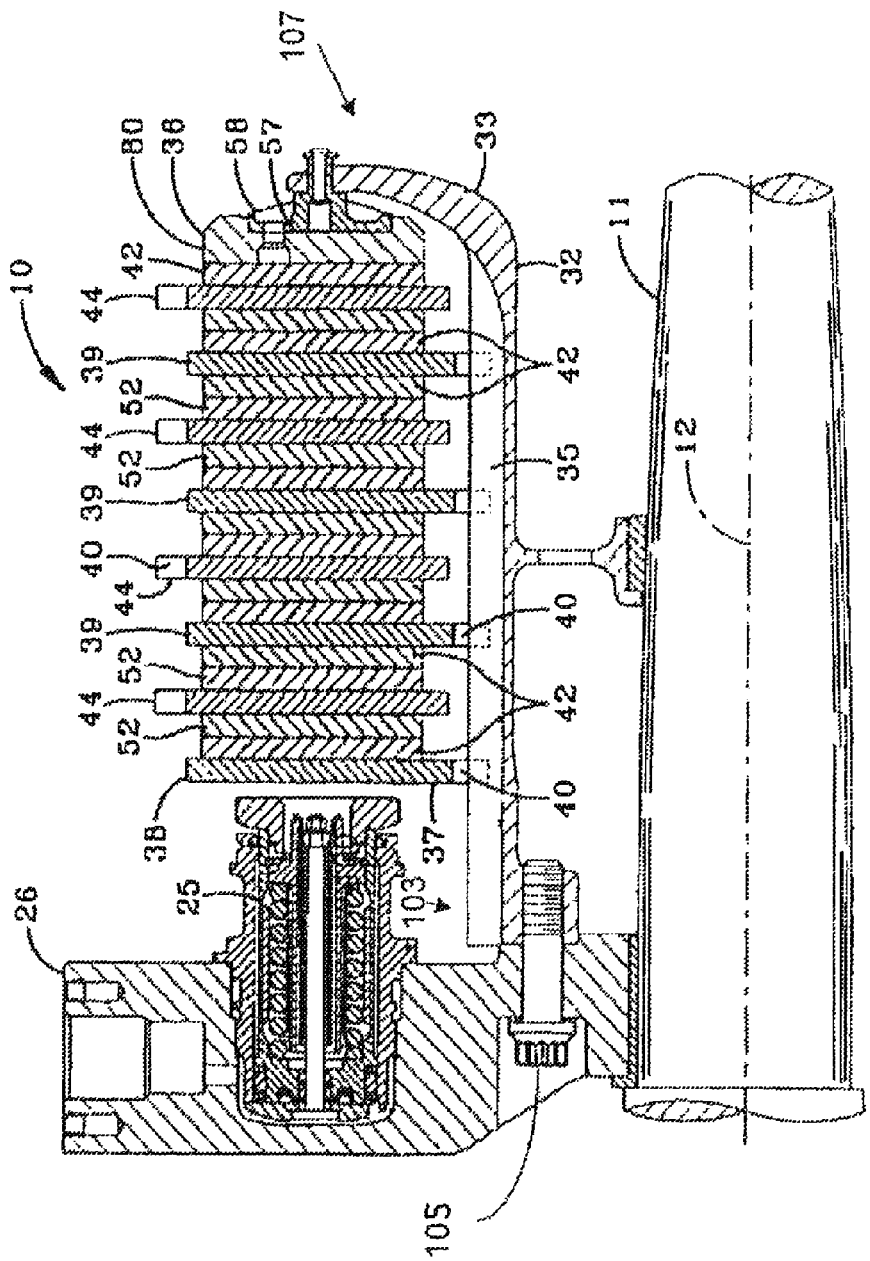
FIG. 1 is a schematic cross-sectional view of an exemplary aircraft brake assembly showing a piston housing with an actuating cylinder, pressure plate, torque plate and brake stack.

Referring to the drawings, wherein like reference numerals designate like or corresponding parts throughout the several views, there is schematically depicted in FIG. 1 a friction brake mechanism 10 mounted on axle 11 for use with a wheel (not illustrated) rotatable about axial centerline 12 in a manner fully described in U.S. Pat. No. 4,018,082 to Rastogi et al., U.S. Pat. No. 4,878,563 to Baden et al., and U.S. Pat. No. 5,248,013 to Hogue et al. The friction brake mechanism 10 includes a pressure plate 38 adjacent the hydraulic piston motor 25, an end plate 36 distal from the piston motor, and a plurality of interleaved rotor disks 44 and stator disks 39 which together form the brake heat sink or brake stack. The friction brake mechanism 10 also includes a torque plate 32, 33 on which the pressure plate 38, end plate 36 and stator disks 39 are slidably mounted against rotation relative to the wheel and rotor disks 44.

Torque plate 32, 33 includes an annular brake torque plate back leg 33 at its end distal the piston motor 25. The brake torque plate back leg 33 may be made integral with the torque tube 32 as shown in FIG. 1 or may be made as a separate annular piece and suitably connected to the stationary torque tube 32. Torque tube 32 may include a support structure 32a formed in an inner surface of the torque tube 32. Torque tube 32 has a plurality of circumferentially spaced splines 35 that are axially extending. Splines 35 on torque tube 32 support the axially moveable nonrotatable pressure plate 38 and axially moveable nonrotatable stator disks 39. All of such stator disks 39 and pressure plate 38 have notches 40 in the form of slotted openings at circumferentially spaced locations on their inner periphery for captive engagement by the spline members 35 as is known in the art. The respective annular stator disks 39 each have friction linings 42 secured to opposite faces thereof as shown in FIG. 1. Pressure plate 38 also has a friction lining 42 on one surface thereof to act in concert with the other friction linings 42 when a braking action occurs. The end plate 36 carries an annular friction lining 42 and is suitably connected to the brake torque plate back leg 33 of the torque plate 32, 33 and acts in concert with the stator disks 39 and the pressure plate 38. The friction linings 42 and the disks they are attached to may be an integral piece such as in carbon composite brakes.

The plurality of axially spaced rotor disks 44 interleaved between the pressure plate 38 and the stator disks 39 have a plurality of circumferentially spaced notches 40 along their outer periphery for engagement by corresponding ribs secured to or integral with the inner periphery of the wheel. Such stator disks 39 with their friction linings 42 and rotor disks 44 with their friction linings 52 acting together during a braking action provide a heat sink. The number and size of the disks may be varied as is necessary for the application involved.

The actuating mechanism for the brake includes a plurality of hydraulic piston assemblies 25 circumferentially spaced around the annular piston housing 26 in known manner. Only one piston assembly is shown in FIG. 1. Upon actuation by fluid pressure, the piston motors 25 effect a braking action by moving the pressure plate 38 and the stator disks 39 into frictional engagement with the rotor disks 44 and against the brake torque plate 33. Alternatively, an electrically driven actuator may be used in place of the hydraulic assembly.

The pressure plate 38 can be formed of carbon or ceramic composite material and has an annular friction lining 42 of carbon or ceramic composite material attached as by rivets to the surface of pressure plate 38 opposite to the face of the pressure plate carrier 37 that receives the head of the hydraulic piston motors 25. The carrier 37 of pressure plate 38 is engaged to the torque tube 32 via slotted opening at circumferentially spaced locations on its inner periphery. The friction lining 42 may be riveted to the pressure plate carrier 37 to locate the lining in position. The friction lining 42 may be an integral part of the pressure plate 38.

The end plate 36 can include a friction lining 80 having a plurality of torque transfer recesses 57 for engagement with a plurality of torque transfer buttons 58. The friction lining 80 may be secured to the torque buttons 58 by a plurality of rivets which pass through the regions of greatest thickness of the friction lining and recessed regions of the torque buttons.

Figure 2:
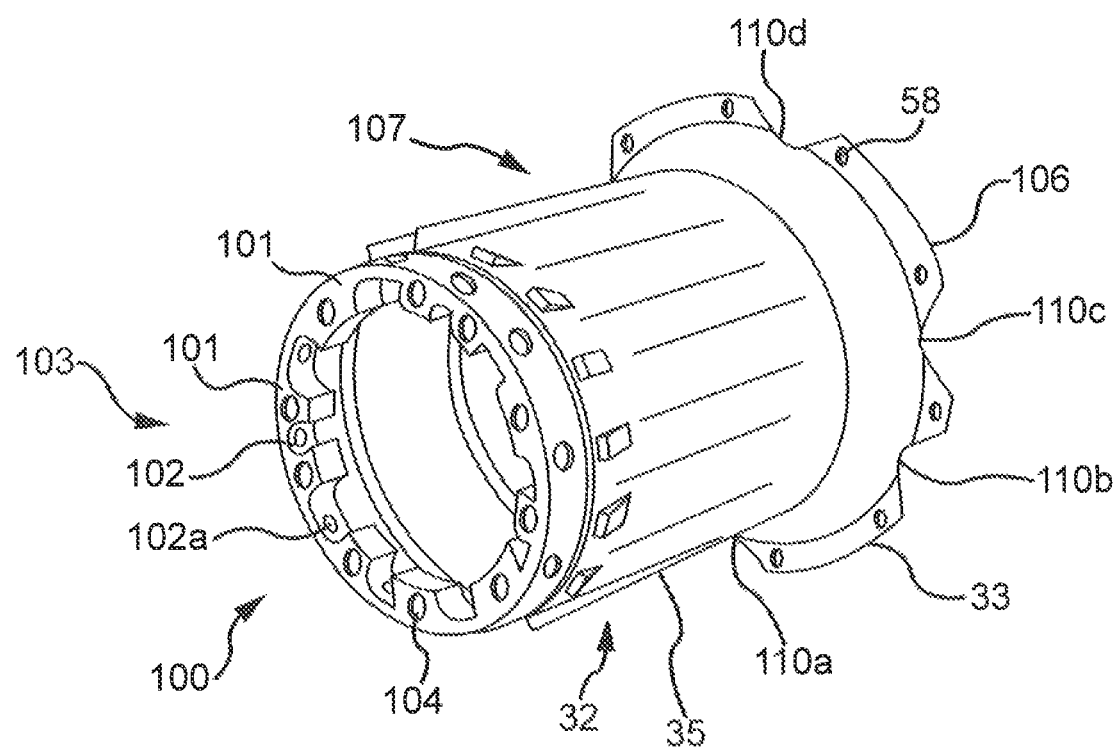
FIG. 2 is perspective view of a brake torque plate in accordance with the invention.
Figure 3B:
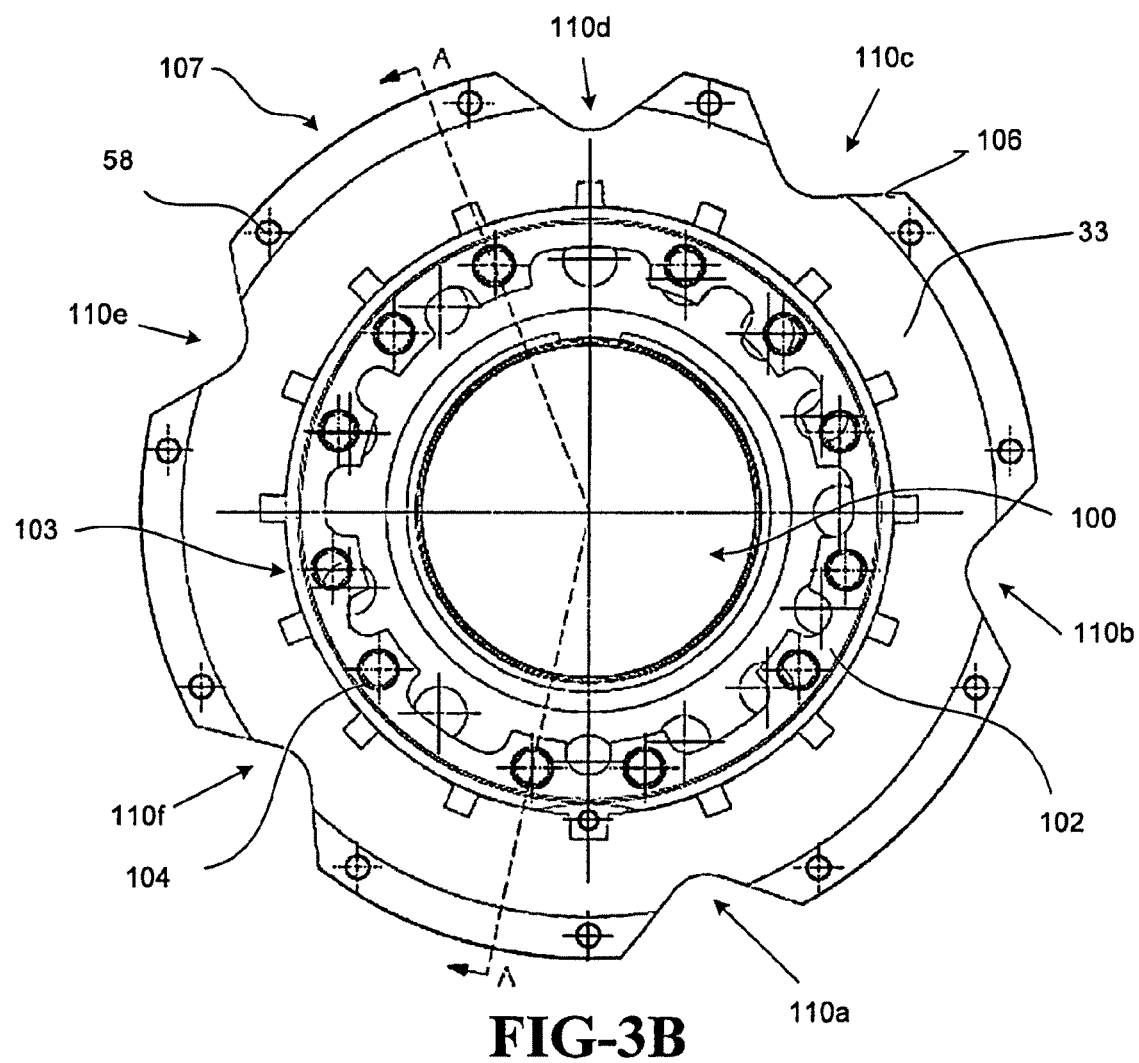

With further reference to FIGS. 2, 3A and 3B, there is shown a perspective, cross sectional and end view of a torque plate that can be used in the brake mechanism 10 of FIG. 1, wherein the torque plate includes a torque tube 32 and an exemplary brake torque plate back leg 33 in accordance with the invention. The torque tube 32 may be formed as an elongated shaft having a hollow central portion 100. An annular mounting surface 102 or the like is formed on a proximal end 103 of the torque tube 32 and includes a plurality of threaded bores 104 formed therein. The torque tube 32 can be attached to the piston housing 26 via the annular mounting surface 102, wherein bolt fasteners 105 (see FIG. 1) hold the torque tube 32 to the piston housing 26.

The torque tube 32 may include a plurality of symmetrically or asymmetrically spaced apertures 101 formed along an inner radial surface of the torque tubes's proximal end 103. The apertures 101 can have varying shapes, and can serve as an alignment aid when attaching the torque tube 32 to the piston housing 26. Bores 102a formed through an outer radial surface of the torque tube's proximal end 103 can be used as an alternate means for attaching the torque tube 32 to the piston housing 26.

A distal end 107 of the torque tube 32 includes or is otherwise attached to the back leg 33. For example, and as noted above, the brake torque plate back leg 33 may be formed integral to the torque tube 32, or the brake torque plate back leg 33 may be formed as a separate piece and attached to the torque tube 32, e.g., via bolt fasteners (not shown). The brake torque plate back leg 33 flares outward from the central portion 100 of the torque tube 32 so as to have a conical shape.

A peripheral ring 106 formed along an outer diameter of the conical portion of the brake torque plate back leg 33 includes circular torque transfer buttons 58. The torque transfer buttons 58 can react to the brake actuation loads and also serve as torque reaction points (i.e., the back leg) for the end plate 36.

Formed on the radially outer areas of the conical portion of the brake torque plate back leg 33 are a plurality of apertures 110a-110f or slots, wherein the apertures are unevenly spaced around the circumference of the conical portion. For example, the torque transfer buttons 58 are shown evenly (i.e., symmetrically) spaced around the circumference of brake torque plate conical portion. The apertures 110a-110f, however, are not evenly spaced along the circumference (e.g., one torque transfer button 58 is between apertures 110c and 110d, while two torque transfer buttons 58 are between the remaining apertures. Although six apertures are shown, more or fewer apertures may be provided without departing from the scope of the invention. Further, the spacing between apertures also may vary (e.g., some may be separated by 1 button, some by two buttons, some by three buttons, etc.).

The apertures may be formed anywhere along the area between the outer peripheral ring 106 and the torque tube 32. Preferably, the apertures 110a-110f are formed along the peripheral ring 106, and may be machined into the brake torque plate back leg 33 or formed therein to a depth that does not intrude greatly into the conical portion, which provides most of the stiffness. The apertures or "segments" (also referred to as "fingers") may be thought of as providing varying torsional and axial strength to the torque plate back leg 33.

Regardless of how the apertures are formed, they reduce symmetry in the back leg area of the brake torque plate 32, 33. This has the effect of reducing general high frequency (e.g., 3-5 kHz) vibration levels in the brake assembly (tests have shown 50 percent or more reduction in high frequency vibration levels), which increases the life expectancy of the braking system components. Further, this reduction in vibration has been found to provide more consistent brake friction from cycle to cycle for each braking condition (e.g., landing, taxi stop), which can promote improved wear rates.

Figure 4:
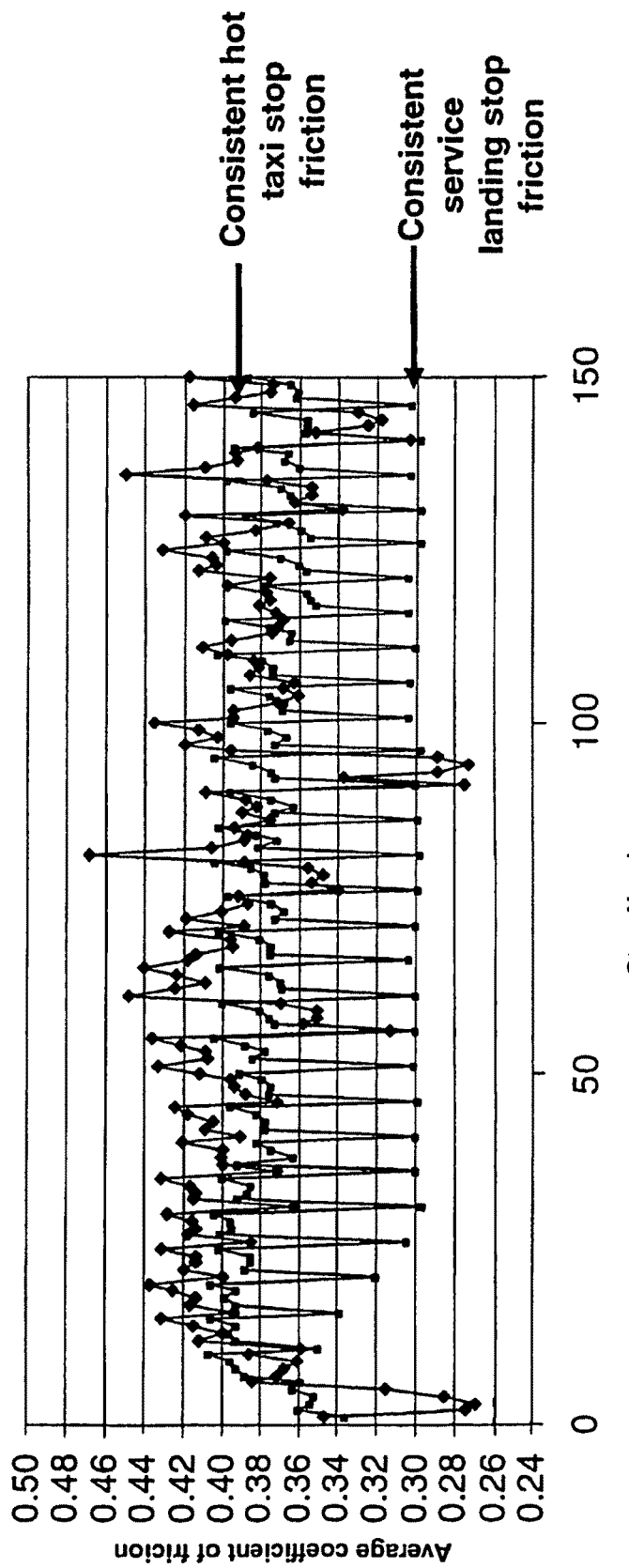
FIGS. 4 and 5 are plots showing average friction coefficient relative to the number of stops for a brake employing a conventional torque plate and the torque plate according to FIGS. 2 and 3.
Figure 5:
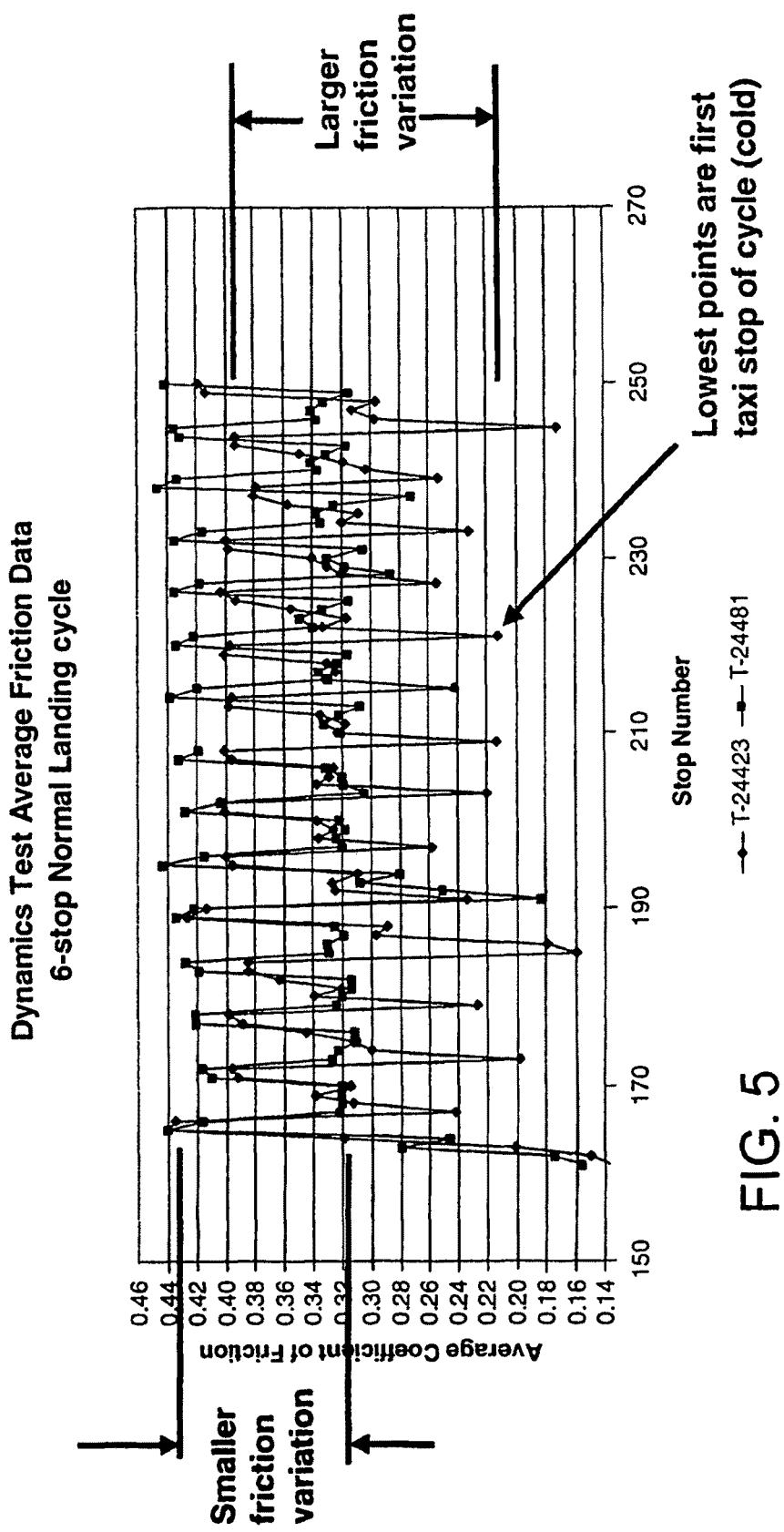

FIGS. 4 and 5 are graphical charts that demonstrate friction variability effects of the asymmetrically placed apertures on a braking system. More specifically, FIG. 4 illustrates the dynamics of average friction data for a 5-stop service cycle for two different brake configurations. A service cycle includes a landing stop and hot taxi stops. T-24423 represents test data for a brake employing a conventional, symmetrical torque plate, while T-24481 represents test data for a brake employing a torque plate in accordance with the invention.

As can be seen in FIG. 4, the test data shows that for T-24481 both hot taxi stop coefficient of friction 120 and landing stop coefficient of friction 122 remain relatively constant through a number of stops. For example, the service landing stop coefficient of friction exhibits very little variation after about stop 30 (the coefficient of friction remains about 0.30), and effectively approaches a straight line plot. Similarly, the hot taxi stop coefficient of friction also remains substantially constant throughout the test (e.g., between about 0.39 and 0.40).

In contrast, the service landing stop friction and the hot taxi stop friction vary significantly in the test data for T-24423. In particular, service landing stop coefficient of friction varies from about 0.26 all the way up to about 0.38. Similarly, the hot taxi stop coefficient of friction varies from about 0.42 to 0.47

With reference to FIG. 5, the coefficient of friction variation between the two different brake types can be seen in testing performed using design landing (normal) energy, high deceleration stops with cold and hot taxi stops. In particular, the coefficient of friction variation for the brake using the torque plate in accordance with the present invention (T-24481) is between about 0.32 and 0.44 (i.e., a variation of about 0.12). In contrast, the coefficient of friction variation for the brake using a conventional, symmetrical torque plate (T-24423) is between about 0.21 and 0.40 (i.e., a variation of about 0.19).

Thus, the torque plate in accordance with the invention reduces vibration in the brake system. This reduced vibration in turn reduces variation in the coefficient of friction for the braking components, thus providing more consistent braking torque.

As noted above, the torque plate in accordance with the present invention also reduces vibration during a stop. It is believed that the apertures in the back leg offer decoupling of the torque plate barrel and back leg vibration modes.

Figure 6:
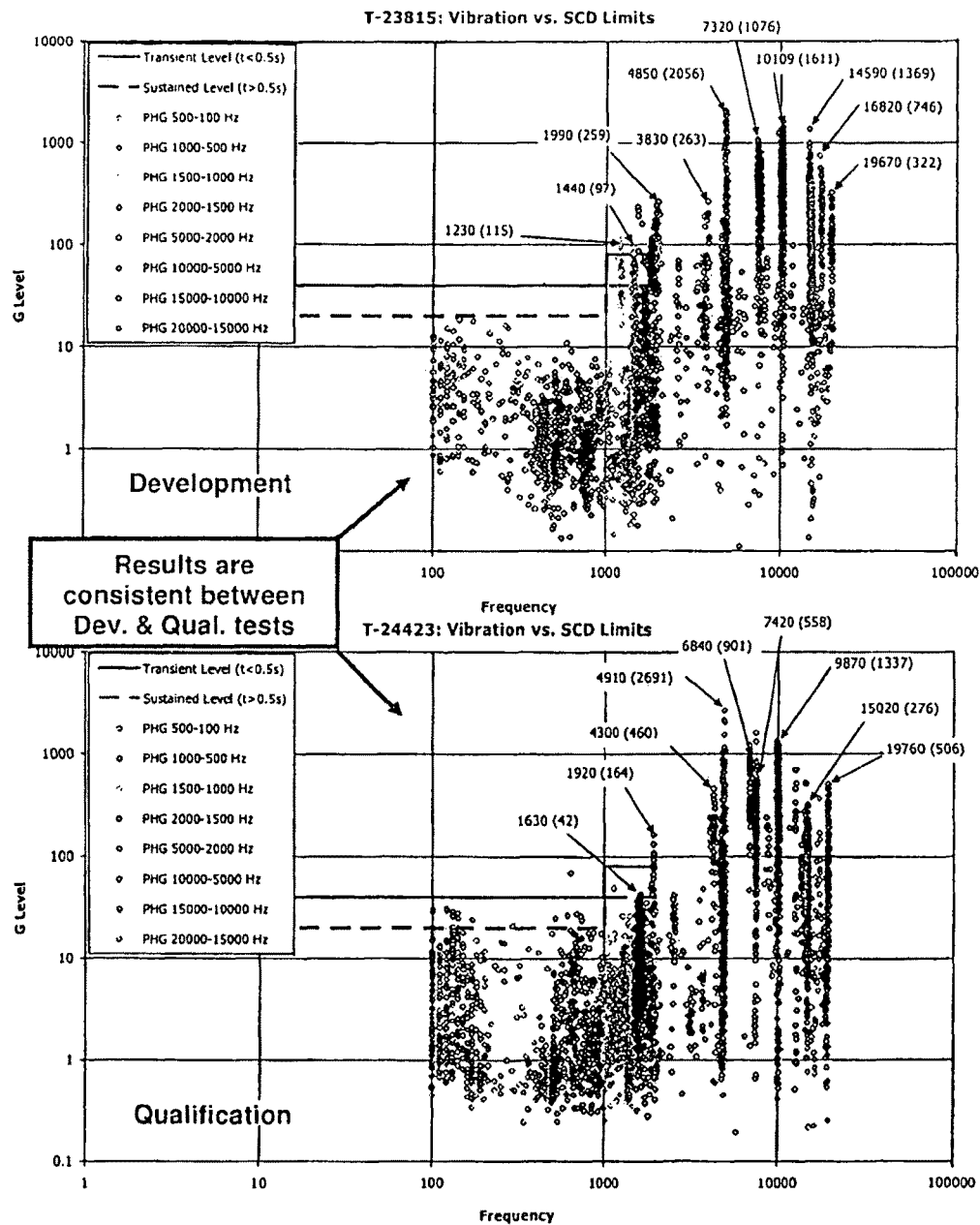
FIG. 6 illustrates two vibration plots for a brake using a torque plate having a conventional back leg.
Figure 7:
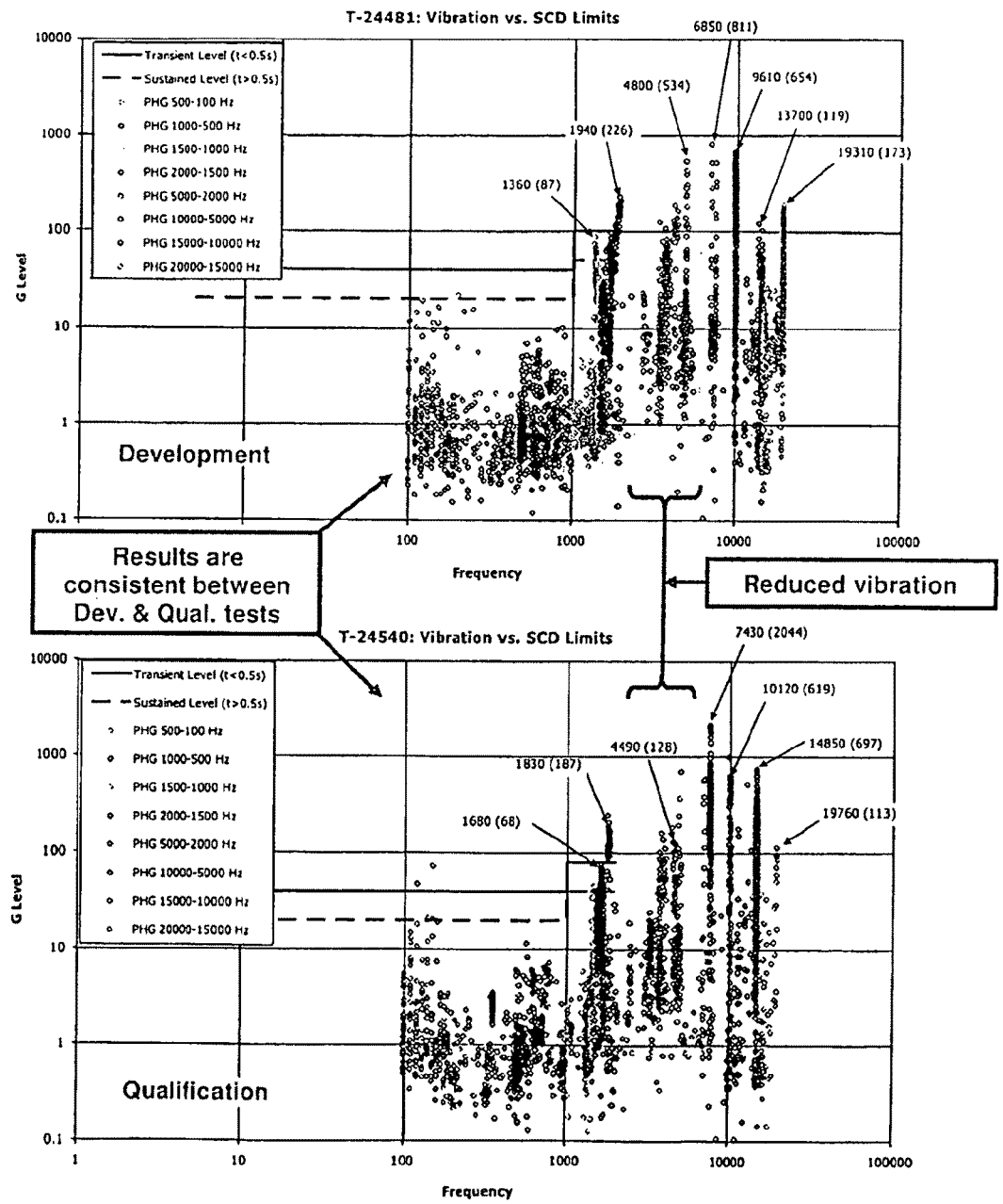
FIG. 7 illustrates two vibration plots for a brake using a torque plate having a back leg in accordance with the present invention.
Figure 8A:
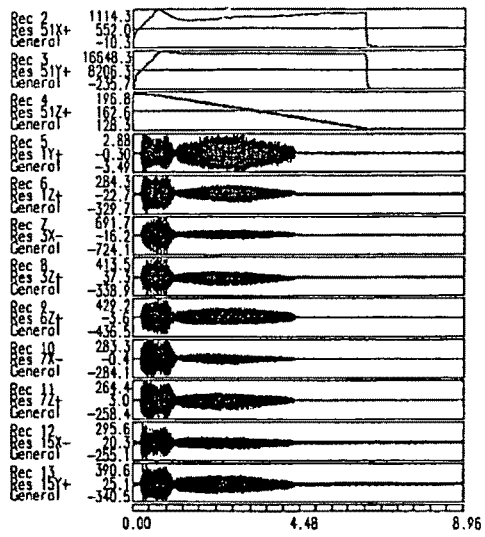
FIGS. 8A-8D show transient vibration plots during a landing snub for brakes using a torque plate having a conventional back leg and a back leg in accordance with the present invention.
Figure 8B:
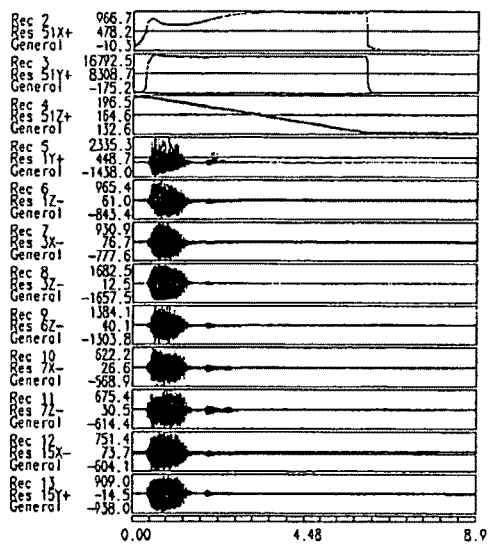
Figure 8C:
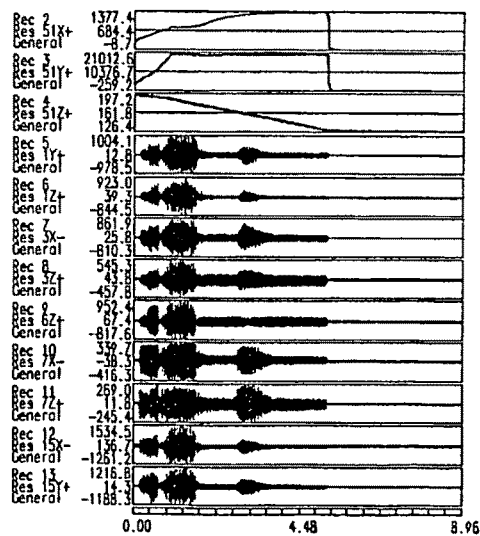
Figure 8D:
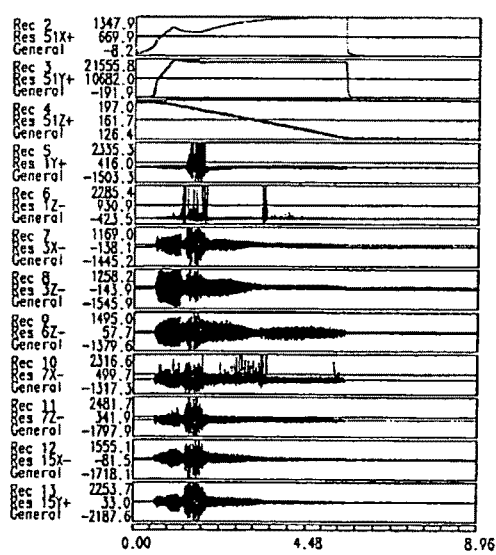
Figure 9A:
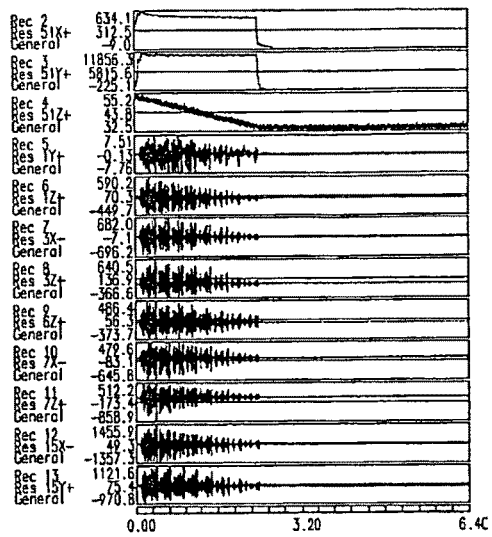
FIGS. 9A-9D show transient vibration plots during a hot taxi stop for brakes using a torque plate having a conventional back leg and a back leg in accordance with the present invention.
Figure 9B:
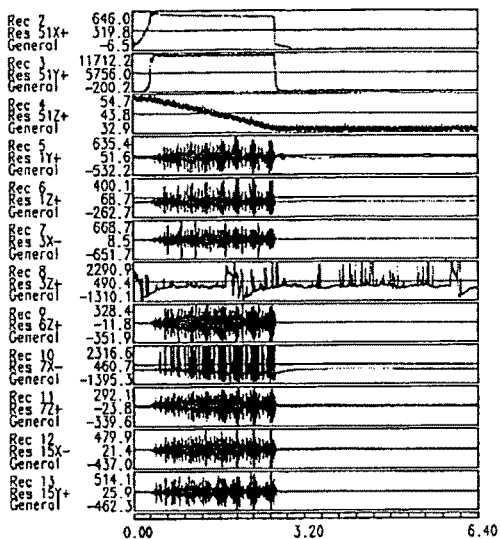
Figure 9C:
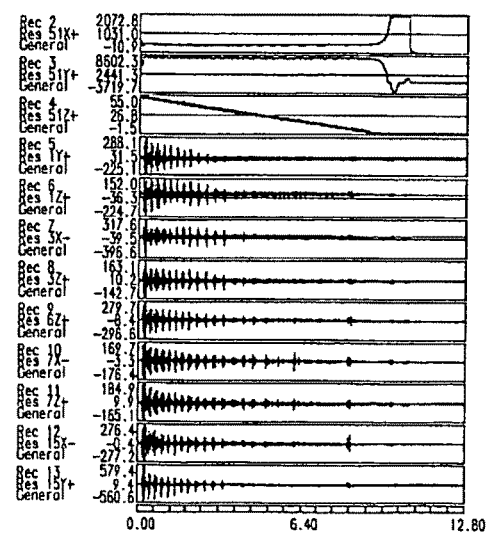
Figure 9D:
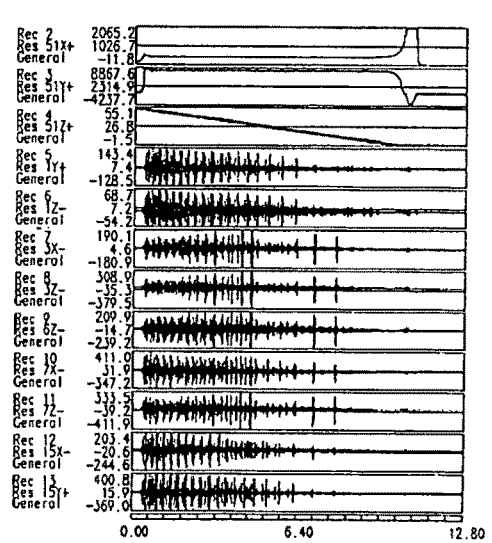

FIGS. 6 and 7 compare the peak vibration levels recorded for all stops over the spectrum of frequencies, wherein peak values for each of the high frequency modes are noted on each graph. The data shown in FIG. 6 (T-24423) pertain to a conventional back leg design, while the data in FIG. 7 (T-24540) pertain to a back leg in accordance with the present invention.

Further, FIGS. 8A-8D and 9A-9D show transient vibration plots for individual landing and taxi stops for two qualification test, wherein FIGS. 8A, 8C, 9A and 9C pertain to a conventional back leg design, and FIGS. 8B, 8D, 9B and 9D pertain to a back leg in accordance with the present invention. The data in these plots includes the full range of frequencies measured during the tests.

Comparing the results of the tests, it is noted that peak vibration between comparable development and qualification hardware configurations are very consistent in both cases (baseline back leg and slotted back leg). Some differences are present between higher frequencies in test no. 24481 and 24540 due to variations in torque plate section thickness in the back leg. Also, there is a noticeable reduction in peak vibration at frequencies below 5 kHz for the back leg design in accordance with the invention.

Accordingly, a brake torque plate for use in an aircraft braking system has been disclosed. The brake torque plate reduces high frequency vibration in aircraft braking systems, thereby increasing the life expectancy of the system. Further, the brake torque plate in accordance with the invention provides for consistent coefficients of friction, even after repeated stops.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A brake comprising a brake disk stack including stators alternating with rotors that are rotatable relative to the stators about an axis of the disk stack, an annular torque plate including a back leg at one axial end of the brake disk stack, and a circumferential arrangement of actuators at the other axial end of the brake disk stack for urging the brake disk stack against the annular torque plate to effect a braking force on the rotors, wherein the back leg of the annular torque plate comprises a conical shape and includes a plurality of apertures arranged unevenly about a circumference of the conical shape, wherein the apertures open to radial outer sides of the annular torque plate back leg, wherein the apertures are at least partially bound by a concave surface of the back leg, and wherein a plurality of torque transfer buttons are arranged evenly about the circumference of the conical shape.

2. The brake according to claim 1, further comprising a torque tube, wherein said torque plate back leg is integrally formed with said torque tube.

3. The brake according to claim 1, wherein said torque plate flares radially outward from an inner portion of the torque plate to an outer portion of the torque plate.

4. The brake according to claim 1, wherein the torque plate includes an inner mounting region and an outer reacting surface, and the apertures are formed between the inner mounting region and the outer reacting surface.

5. An aircraft comprising the brake according to claim 1.

6. A brake torque plate for providing a reacting surface for disk-stack actuation loads, comprising:
- an annular plate having an axis of rotation and having a conical shape; and
- a plurality of apertures formed in the annular plate arranged unevenly about a circumference of the conical shape, wherein the apertures open to radial outer sides of the annular plate, wherein the apertures are at least partially bound by a concave surface of the conical shape and wherein a plurality of torque transfer buttons are arranged evenly about the circumference of the conical shape.

7. The brake torque plate according to claim 6, further comprising a torque tube integrally formed with said annular plate.

8. The brake torque plate according to claim 6, wherein said annular plate flares radially outward from an inner portion of the annular plate to an outer portion of the annular plate.

* * * * *